(12) United States Patent
Ruiz

(10) Patent No.: US 7,272,277 B2
(45) Date of Patent: Sep. 18, 2007

(54) DATA EXCHANGE ARCHITECTURE USING OPTICAL LINKS

(75) Inventor: Everardo D. Ruiz, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 47 days.

(21) Appl. No.: 11/020,701

(22) Filed: Dec. 23, 2004

(65) Prior Publication Data

US 2006/0140572 A1    Jun. 29, 2006

(51) Int. Cl.
G02B 6/28 (2006.01)
G02B 6/36 (2006.01)

(52) U.S. Cl. .............. 385/24; 385/88; 385/92

(58) Field of Classification Search ........ 398/141–145; 385/24
See application file for complete search history.

(56) References Cited

U.S. PATENT DOCUMENTS

| | | | |
|---|---|---|---|
| 4,252,402 A | | 2/1981 | Puech et al. |
| 4,863,233 A | * | 9/1989 | Nienaber et al. ............. 385/89 |
| 5,062,059 A | * | 10/1991 | Youngblood et al. ....... 709/217 |
| 5,313,323 A | | 5/1994 | Patel |
| 5,917,968 A | * | 6/1999 | Wood ........................... 385/15 |
| 6,021,234 A | | 2/2000 | Van Deventer |
| 6,069,621 A | * | 5/2000 | Schupak ...................... 715/717 |
| 6,453,377 B1 | | 9/2002 | Farnworth et al. |
| 6,502,997 B1 | | 1/2003 | Lee et al. |
| 6,538,785 B1 | * | 3/2003 | Kim et al. ................... 398/140 |
| 2003/0071791 A1 | * | 4/2003 | Hanson et al. .............. 345/169 |
| 2003/0113078 A1 | | 6/2003 | Tatum |
| 2003/0215235 A1 | * | 11/2003 | Norizuki et al. .............. 398/59 |
| 2005/0021870 A1 | * | 1/2005 | Carnahan et al. ............ 709/249 |
| 2005/0055472 A1 | * | 3/2005 | Krzyzanowski et al. ........ 710/5 |
| 2005/0160186 A1 | * | 7/2005 | Ruiz .............................. 710/1 |
| 2005/0226617 A1 | * | 10/2005 | Lee et al. ...................... 398/79 |
| 2006/0056779 A1 | * | 3/2006 | Wang ........................... 385/92 |
| 2006/0067631 A1 | * | 3/2006 | Wang et al. .................. 385/92 |

FOREIGN PATENT DOCUMENTS

| | | |
|---|---|---|
| EP | 0557959 A1 | 9/1993 |
| EP | 1494124 A2 | 1/2005 |
| WO | WO93/08654 A1 | 4/1993 |
| WO | WO 01/80025 A1 | 10/2001 |
| WO | PCT/US2005/046998 | 6/2006 |

* cited by examiner

*Primary Examiner*—Michelle R. Connelly-Cushwa
*Assistant Examiner*—Rhonda S. Peace
(74) *Attorney, Agent, or Firm*—Blakely, Sokoloff, Taylor & Zafman LLP

(57) ABSTRACT

A data exchange architecture using optical links. A device is proximate to a display screen. An optical module is coupled to the device. An optical link is coupled to the optical module, wherein the optical module to convert optical signals received by the optical module over the optical link into electrical signals for the device.

26 Claims, 13 Drawing Sheets

DATA EXCHANGE ARCHITECTURE USING OPTICAL LINKS

BACKGROUND

1. Field

Embodiments of the invention relate to the field of computer system architecture and more specifically, but not exclusively, to a data exchange architecture using optical links.

2. Background Information

Computer systems include various devices that exchange data. Some devices, such as displays, consume large amounts of data. Modern computer systems also exchange information with other systems using wireless connections.

Components in today's computer systems are often connected using metal wiring, such as copper. However, metal interconnects may suffer from electromagnetic interference as well as cause interference in other metal interconnects. Metal interconnects have limited data rates and dissipate energy that affects the performance of a machine. Further, metal interconnects fed through the hinge of a notebook computer, or other similar devices, are susceptible to physical failure due to repeated folding, sliding, or twisting. Also, metal interconnects contribute to the weight of notebook computers.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
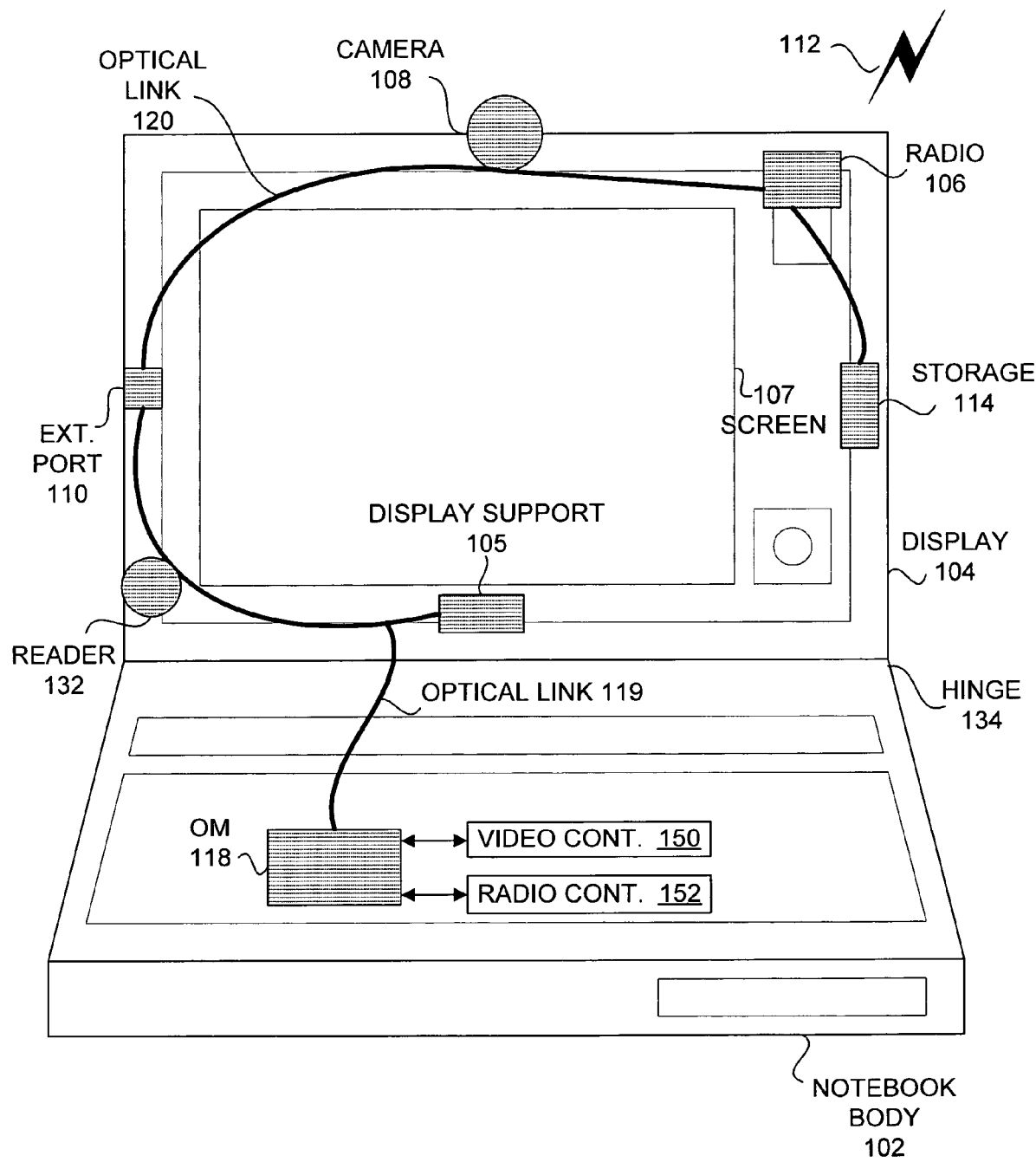
FIG. 1A is a block diagram illustrating one embodiment of a data exchange architecture using optical links in accordance with the teachings of the present invention.
Figure 1B:
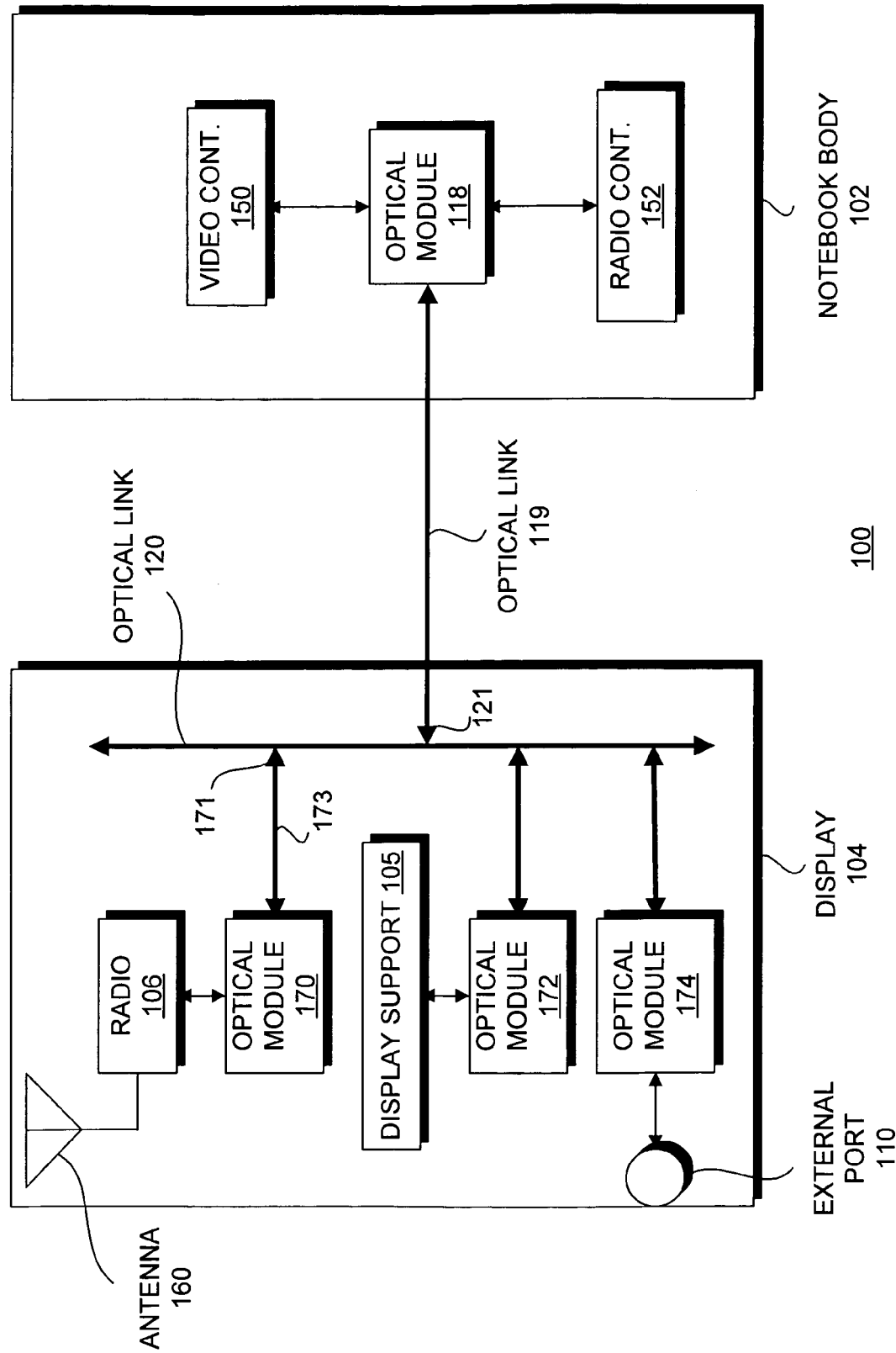
FIG. 1B is a block diagram illustrating one embodiment of a data exchange architecture using optical links in accordance with the teachings of the present invention.

Referring to FIGS. 1A and 1B, a mobile computer system in accordance with one embodiment of the present invention is shown. As used herein, a mobile computer system includes a computer system designed for travel. The term "mobile" as used herein also includes computer systems that may be considered portable, such as a copy machine, a fax machine, home entertainment components, and the like. Examples of mobile computer system include, but are not limited to, a notebook computer (a.k.a., a laptop computer), a pocket PC (personal computer), a mobile phone, a personal digital assistant, a digital camera, a digital video camera, and the like. Mobile computers systems may also include media players, such as an Apple® iPod®, a Dell DJ™, and the like.

FIGS. 1A and 1B show one embodiment of a notebook 100. Notebook 100 includes a notebook body 102 coupled to a display 104 by a hinge 134. Hinge 134 includes gimbaled joints or other multi-dimensional connections. In one embodiment, display 104 is detachable from notebook body 104. As will be described below, notebook 100 includes devices connected using optical links in a bus configuration.

As used herein, the term "device" includes a hardware unit outside of a processor of a computer system. In one embodiment, a device is a hardware unit that interacts with a central processing unit and system memory of a computer system. Devices may also be known as peripheral devices, input/output devices, and add-in devices. Devices may include additional system memory and secondary processors. In yet another embodiment, a device is proximate to a display screen.

Display 104 includes various devices including a display support 105 for a display screen 107, a reader 132, an external port 110, a camera 108, a radio 106, and storage 114 coupled by an optical link 120. These devices will be discussed in turn below. It will be understood that embodiments of the invention may include other devices coupled together using optical links as described herein.

Optical link 120 is coupled to optical link 119 to connect the components in display 104 to notebook body 102. It will be appreciated that an optical link configuration as described herein may also be used to remote devices from a display to a body. For example, in one embodiment, display 104 may include a motherboard having a central processing unit and supporting chipset. In this particular embodiment, communications between the motherboard and devices in the body use an optical link architecture as described herein.

As used herein, an optical link includes an optical transmission medium that carries optical signals between two or more devices. In some embodiments, optical links may be be-directional, while in another embodiments, optical links may be uni-directional. While some figures herein represent optical links with a double-headed arrow, it will be understood that such optical links are not necessarily bi-directional.

Optical links may transmit data at various data rates. In one embodiment, data is transmitted on the optical links at least at 1 Gigabit per second or higher. In another embodiment, data having video signals for a display screen is transmitted over an optical link at approximately 10 Gigabits per second or higher. It will be understood that embodiments of the invention are not limited to these data rates.

In one embodiment, an optical link includes one or more optical waveguides. An optical waveguide includes an optical fiber, such as a glass optical fiber and a plastic optical fiber, a free-space optical interconnect, and the like. Optical signals include digital optical signals, analog optical signals, or any combination thereof. In an embodiment of an optical link having multiple optical fibers, the multiple optical fibers may be bundled together in a fiber ribbon cable.

Notebook body 102 includes a video controller 150 and a radio controller 152 coupled to an optical module (OM) 118. Video controller 150 supports display screen 107 and radio controller 152 supports radio 106.

In one embodiment, each device of display 104 has its own associated optical module for sending and/or receiving optical signals on optical link 120. For example, radio 106 is coupled to optical module 170 which is coupled to optical link 120. Display support 105 is coupled to optical module 172. OM 172 is coupled to optical link 120. External port 110 is coupled to optical module 174. OM 174 is coupled to optical link 120 which is coupled to optical link 120. In one embodiment, OMs 170, 172, and 174 are each coupled to optical link 120 by an optical link using an optical junction. For example, in FIG. 1B, optical junction 171 couples optical link 120 to optical link 173. Optical link 173 is also coupled to OM 170.

In one embodiment, optical link 120 may be an optical bus. In one embodiment, optical link 120 is coupled to optical link 119 by an optical link junction 121. Embodiments of an optical junction include a passive splitter and an active splitter. In yet another embodiment, notebook 100 may include a bus controller (not shown) coupled to optical link 120. Such a bus controller may schedule when devices may communicate on optical link 120. For example, radio 106 may be assigned a higher priority for using optical link 120 than a printer coupled to external port 110. In an alternative embodiment, optical link 120 and optical link 119 form a single optical link from OM 118 where the devices of display 104 hang off of this single optical link.

In one embodiment, optical signals may be multiplexed/demultiplexed on optical links 119 and 120. Embodiments of such multiplexing/demultiplexing include Wavelength Division Multiplexing (WDM), Time Division Multiplexing (TDM), and Code Division Multiplexing (CDM). In such multiplexing, each OM 170, 172, and 174 will "listen" for optical signals addressed to its associated device (or devices). For example, in WDM, each OM may process optical signals on its assigned wavelength(s), and ignore optical signals at other wavelengths. In other embodiments, in WDM, an OM may transmit optical signals onto the optical bus at a particular wavelength.

Various communication techniques may be used to carry data on optical link configurations as described herein. In one embodiment, data communications are serial based. Embodiments of data communications may be packet based, non-packet based, or any combination thereof. Embodiments of data communication techniques include Peripheral Component Interface (PCI) Express (*PCI Express Base Specification Revision* 1.0a, Apr. 15, 2003), InfiniBand (*InfiniBand Architecture Specification*, version 1.2, September 2004), and Quadrature Amplitude Modulation (QAM).

FIGS. 1A and 1B show optical modules (OMs) 118, 170, 172, and 174. In general, optical modules include one or more electro-optical devices for converting between electrical signals and optical signals. Embodiments of optical modules include OMs that receive only optical signals, transmit only optical signals, and transmit/receive optical signals (a.k.a., transceivers).

In one embodiment, optical modules are constructed at least in part from injected molded plastic. In another embodiment, optical modules include an integrated silicon driver and a light emitter and/or an optical detector and a receive amplifier. In yet another embodiment, optical fiber is coupled to the optical module using a connector integrated into the optical module plastic housing. In still another embodiment, an optical module may include a leadframe package.

In another embodiment, optical modules include parallel optical modules. Parallel optics involves using a number of optical channels over multiple optical fibers. Usually, each optical fiber carries a single optical channel. Parallel optical modules may be connected by several optical fibers bundled in a fiber ribbon cable.

Embodiments of optical link configurations described herein offer superior performance and architectural flexibility. Optical links are immune from electromagnetic interference, radiation, and conducted emissions. Optical links are light, thus minimizing the weight of a computer system. Optical links do not significantly dissipate energy, such as thermal energy. Using optical links also enables sending signals over distances typically without any meaningful increase in power consumption.

In embodiments of mobile computer systems, moving electrical devices into the display reduces the thermal effects of electrical devices on the notebook body. Also, moving devices into the display frees up space in the notebook body. Further, using optical links in the hinge provides greater durability since optical links, such as optical fiber, are resilient to repeated bending and folding.

Embodiments described herein enable architectural and design freedom. Devices of a computer system may be positioned within the computer system without the same power/distance considerations associated with electrical connections. With optical links, the distance between OMs communicating over an optical link may be increased without the same power increase as with electrical connections. Further, an increase in transmission speed on optical links does not necessitate an increase in power as with electrical connections. It will be appreciated that devices within notebook body 102 may also be interconnected using optical link configurations as described herein.

Embodiments of optical link configurations as described herein may also support Plug and Play. Plug and Play allows a computer system to automatically recognize and setup a device added to a computer system without user intervention. For example, in FIG. 1A, camera 108 may be a detachable device that employs Plug and Play. In one embodiment, a device may be reside in display 104 using a conventional connector, such as a PCI-family connector, Accelerated Graphics Port (AGP), Small Computer System Interface (SCSI), and the like. These connectors may be coupled to notebook body 102 using optical link configurations as described herein. In yet another embodiment, connectors supporting optical links may also include electrical conductors.

Further details regarding devices of display 104 will now be described. Display support 105 includes circuitry for receiving video signals from notebook body 102 and rendering the video signals on display screen 107. In one embodiment, display support 105 may also provide signals to notebook body 102. Embodiments of display screen 107 include a Liquid Crystal Display (LCD) screen, a Thin Film Transistor (TFT) screen, and the like.

In one embodiment, display support 105 includes a display timing controller. In general, a display timing controller determines what column and row of display screen 107 the video data is shown at. In another embodiment, display support 105 includes a video scaler. In general, a video scaler adjusts the rendering of the video data to different display resolutions on display screen 107 or an externally attached display. In yet another embodiment, display support 105 may include circuitry to support video effects, such as Picture-in-Picture (PiP).

Reader 132 includes a reader for media cards, such as, but not limited to, CompactFlash, Sony Memory stick, MultiMedia, SmartMedia, Secure Digital, an xD card, and the like. Reader 132 may also include an optical reader such as a bar code reader, and the like.

External port 110 includes an optical port and an electrical port. External port 110 includes a digital port and an analog port. Embodiments of port 110 include a Universal Serial Bus (USB), a serial port, a parallel port, a FireWire port, and the like. It will be understood that notebook 100 may include any combination of different types of external ports.

In one embodiment, camera 108 includes a digital camera for taking digital photos. In another embodiment, camera 108 includes a digital video camera for taking digital video. In yet another embodiment, camera 108 includes a WebCam for sending video over a network.

Storage 114 may include volatile and non-volatile storage. Embodiments of storage 114 include memory, such as Random Access Memory (RAM), a magnetic disk, an optical disk, flash memory, and the like. In one embodiment, storage 114 includes a removable storage bay so that different storage drives, such as an optical disk drive and a magnetic disk drive, may be swapped.

Display 104 also includes radio 160 to send and/or receive wireless signals 112 using an antenna 160. In one embodiment, a single radio may send and/or receive various wireless signal types. In another embodiment, display 104 may include two or more radios coupled to optical link 120 to send and/or receive various wireless signal types.

Wireless signal types include WiMAX (Institute of Electrical Engineers (IEEE) 802.16 standard family), Wireless Fidelity (Wifi) (IEEE 802.11 standard family), Bluetooth (IEEE 802.15 family), Ultra Wide Band (UWB), Group Speciale Mobile (GSM), General Packet Radio Service (GPRS), Third Generation Mobile System (3G), Global Positioning System (GPS), Infrared signals, paging signals, and the like.

In one embodiment, radio 106 may also receive broadcast signals. Broadcast signals include analog and digital broadcast signals, such as Amplitude Modulated (AM) radio, Frequency Modulated (FM) radio, National Television Standards Committee (NTSC) television, Phase Alternate Line (PAL) television, Systeme Electronique Couleur Avec Memoire (SECAM) television, satellite radio, satellite television, wide area broadcast clock synchronization signals, differential positioning signals, and the like.

In one embodiment, radio 106 includes a complete radio. In another embodiment, a portion of radio 106 resides in display 104 and a remaining portion of radio 106 resides in notebook body 106. In yet another embodiment, an analog portion of radio 106 resides in display 104 and a digital portion of radio 106 resides in notebook body 106. In an example of this particular embodiment, the Radio Frequency (RF) portion of radio 106 resides in display 104 and a MAC (Media Access Control) address circuit resides in notebook body 102. Information is passed between the radio portions using optical links. Transmit portions of radio 106 may be similarly separated by optical links.

Radio 106 may receive data as radio frequency, intermediate frequency, baseband analog, and the like. Radio 106 may also sample received analog signals to form digital data signals.

In one embodiment, radio 106 includes a coordination unit for coordinating the sending and/or receiving of wireless signals. This coordination prevents radio 106 from working with more than one wireless signal type at the same time. For example, when radio 106 is transmitting a Wifi signal, radio 106 may stop listening for other signal types.

Placing radio 106 in display 104 instead of notebook body 106 improves operation of radio 106. In the display, radio 106 suffers little interference from other electrical components and their associated electromagnetic fields as compared to the notebook body 102. Placing radio 106 in display 104 also improves the range of radio 106.

Connecting radio 106 to an optical link in display 104 also enables radio 106 to receive radio signals with greater data rates at a given range, or at a given bit rate at ranges further than a system without optical links. Since optical links may support data rates of at least 10 Gigabits per second and radio signals typically transmit at 50-100 Megabits per second, data may be easily accommodated for a variety of radio architectures including digitized sample data from oversampled, downsampled, and sub-sampled radios, or data used for direct digital synthesis.

Figure 1C:
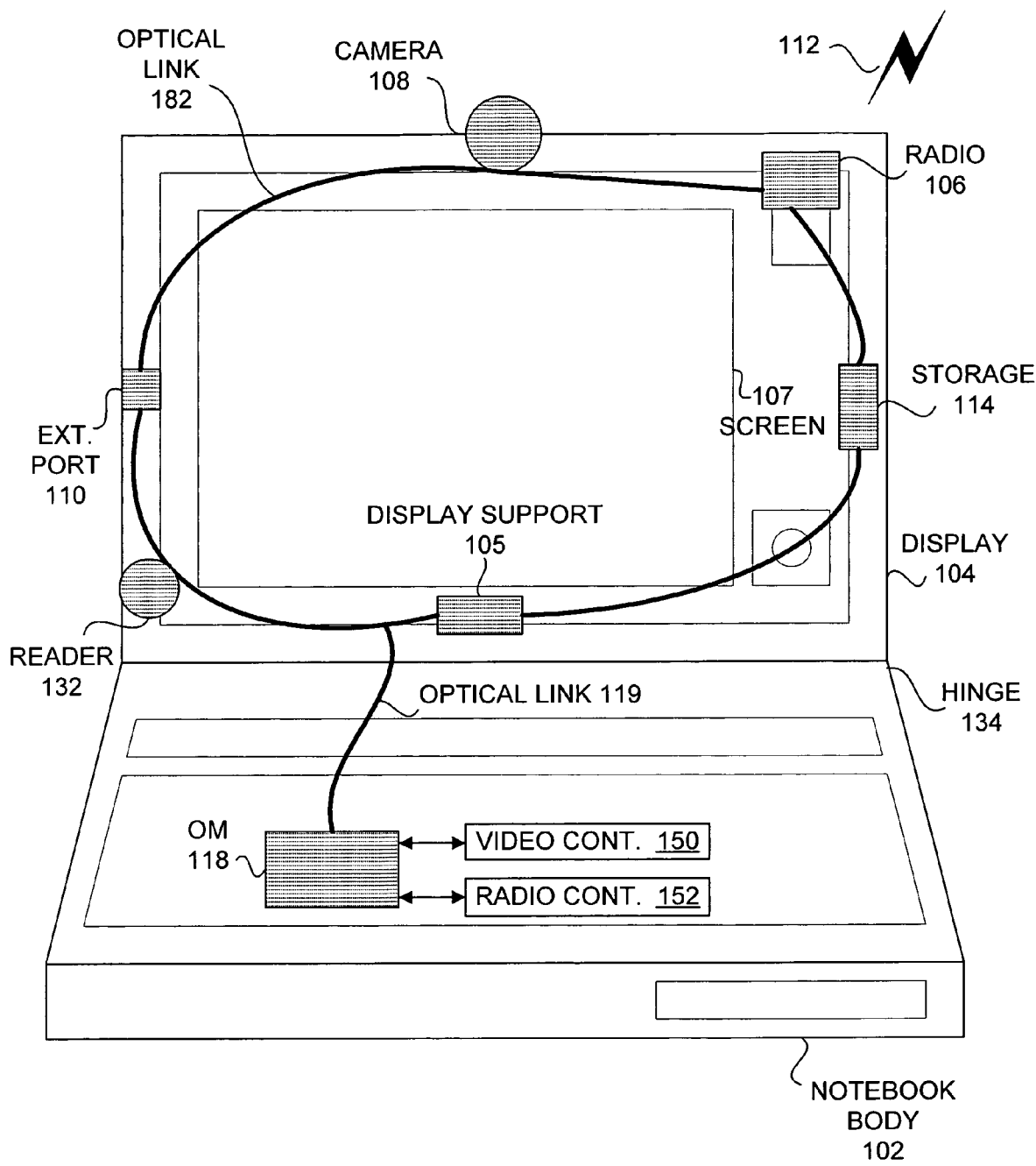
FIG. 1C is a block diagram illustrating one embodiment of a data exchange architecture using optical links in accordance with the teachings of the present invention.

Turning to FIG. 1C, an embodiment a notebook 180 is shown. Notebook 180 includes an optical link 182 coupled to optical link 119 where optical link 182 is in an optical ring configuration. In one embodiment, optical signals may be routed along optical link 182 by ring type communication, such as token ring. In another embodiment, optical signals may be communication in either direction around the ring. In this particular embodiment, if there is a break optical link 182, then optical signals may still be sent to the devices.

Figure 2A:
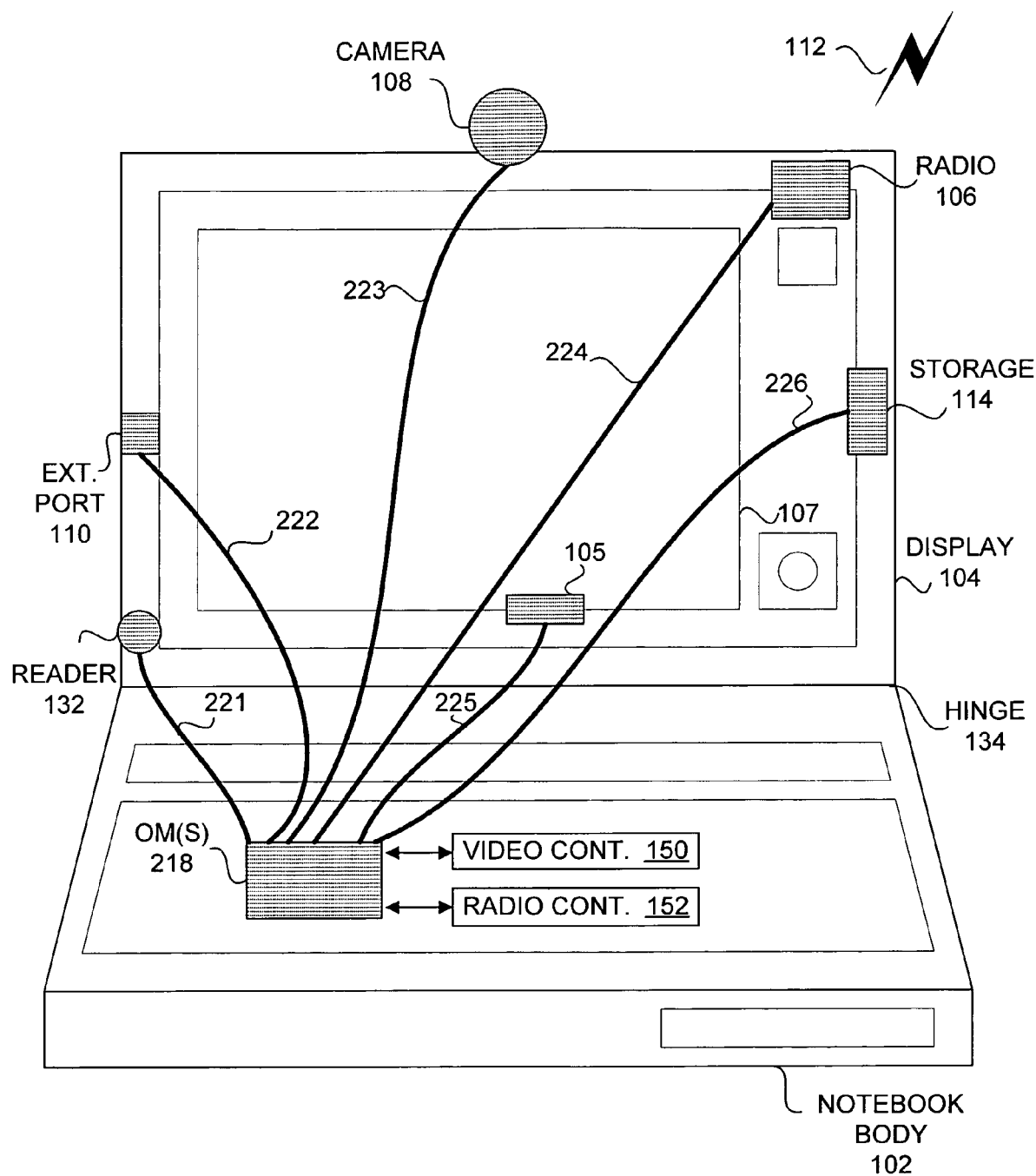
FIG. 2A is a block diagram illustrating one embodiment of a data exchange architecture using optical links in accordance with the teachings of the present invention.
Figure 2B:
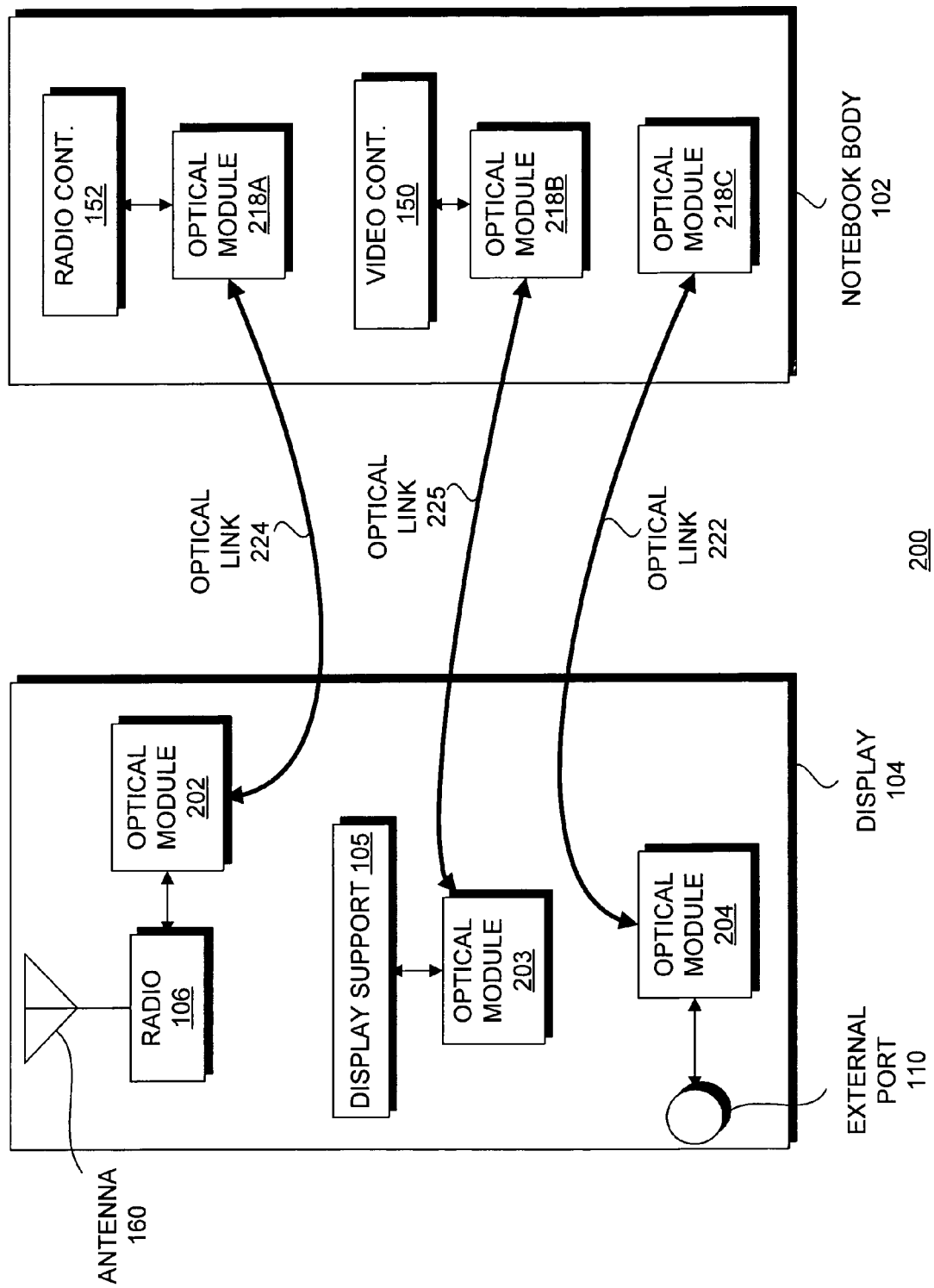
FIG. 2B is a block diagram illustrating one embodiment of a data exchange architecture using optical links in accordance with the teachings of the present invention.

Referring to FIGS. 2A and 2B, a notebook 200 in accordance with one embodiment of the present invention is shown. Notebook 200 includes devices connected to notebook body 102 using optical links in a point-to-point configuration.

Notebook body 102 includes one or more OM(s) 218. In one embodiment, the number of OM(S) 218 corresponds to the number of optical links connected to display 104. In one embodiment, each OM of OM(s) 218 is devoted to a particular optical link. While OM(s) 218 are shown in a single block in FIG. 2A, it will be understood that in an embodiment of two or more OMs, each OM may reside in different positions in notebook body 102.

In notebook 200, reader 132 is coupled to OM(s) 218 by optical link 221. External port 110 is coupled to OM(s) 218 by optical link 222. Camera 108 is coupled to OM(s) 218 by optical link 223. Radio 106 is coupled to OM(s) 218 by optical link 224. Display support 105 is coupled to OM(s) 218 by optical link 225. Storage 114 is coupled to OM(s) 118 by optical link 226.

Turning to FIG. 2B, radio 106 is coupled to an optical module 202. OM 202 is coupled to an OM 218A by optical link 224. OM 218A is coupled to radio controller 152.

Display support 105 is coupled to an optical module 203. OM 203 is coupled to an OM 218B by optical link 225. OM 218B is coupled to video controller 150.

External port 110 is coupled to an optical module 204. OM 204 is coupled to optical module 218C by optical link 222.

Figure 3A:
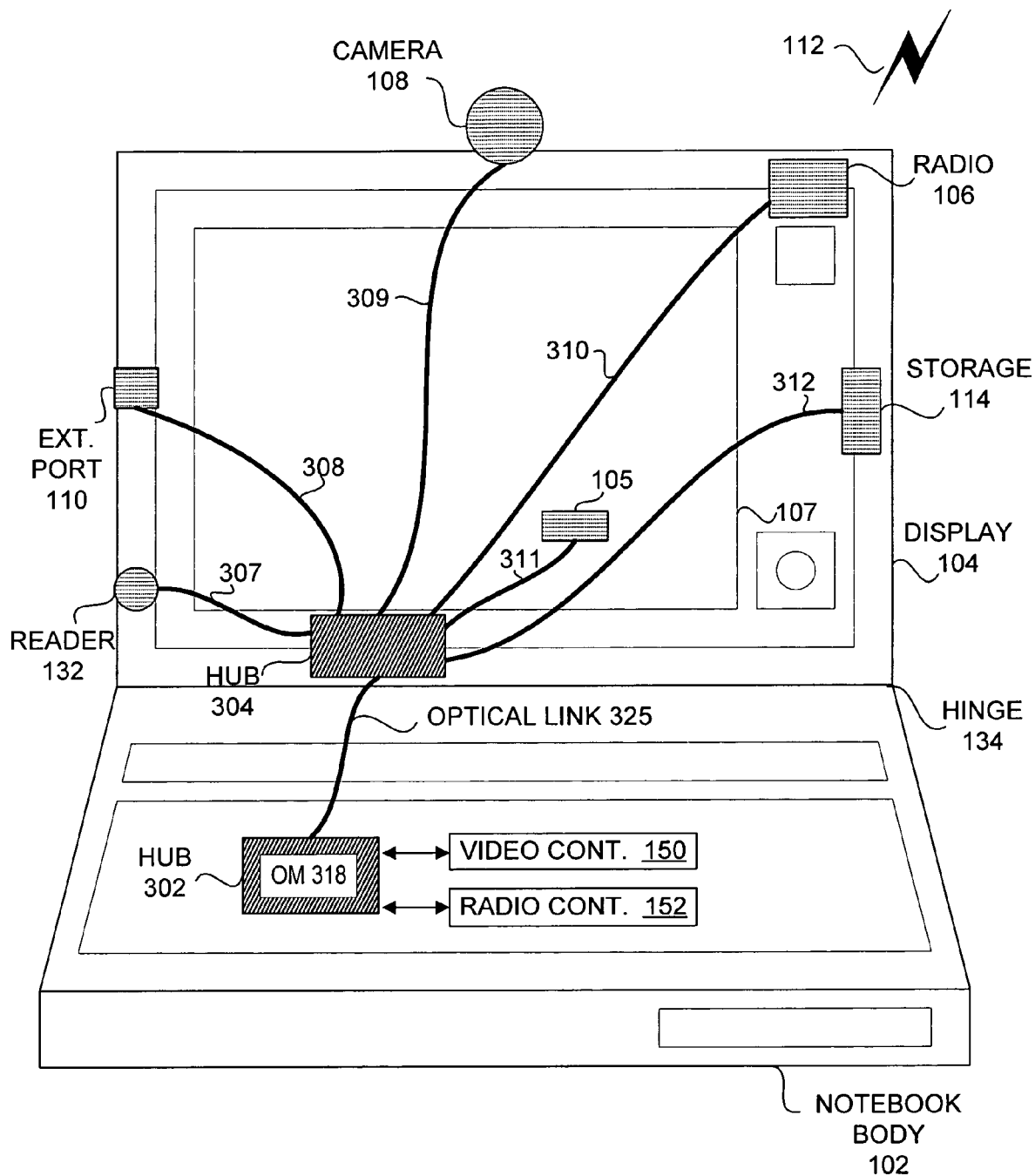
FIG. 3A is a block diagram illustrating one embodiment of a data exchange architecture using optical links in accordance with the teachings of the present invention.
Figure 3B:
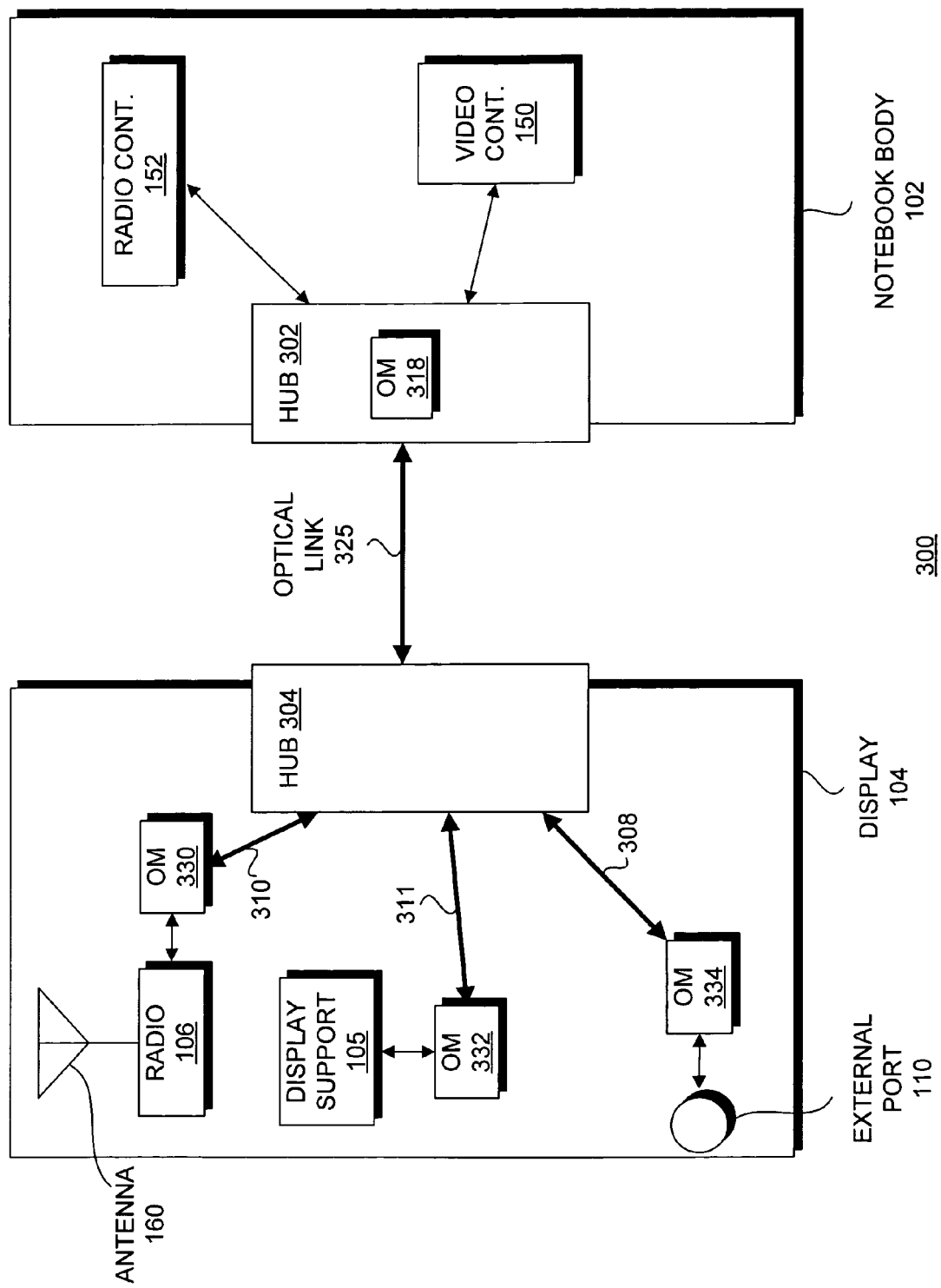
FIG. 3B is a block diagram illustrating one embodiment of a data exchange architecture using optical links in accordance with the teachings of the present invention.

Referring to FIGS. 3A and 3B, a notebook 300 in accordance with one embodiment of the present invention is shown. Notebook 300 includes devices connected by optical links in a hub configuration.

Notebook body 102 includes a hub 302. Display 104 includes a hub 304. Hub 302 includes one or more optical modules 318. Hub 302 is coupled to hub 304 by optical link 325. Hub 302 is coupled to video controller 150 and radio controller 152. Video controller 152 and video controller 150 may provide electrical signals to hub 302 that are converted to optical signals and sent on optical link 325. Conversely, optical signals received at hub 302 are converted to electrical signals and sent to the appropriate controller. In an alternative embodiment, video controller 150 and radio controller 152 may be coupled to hub 302 using optical links.

Hub 304 is coupled to reader 132 using optical link 307. Hub 304 is coupled to external port 110 via optical link 308. Hub 304 is coupled to camera 108 by optical link 309. Hub 304 is coupled to radio 106 using optical link 310. Hub 304 is coupled to display support 105 using optical link 311. Hub 304 is coupled to storage 114 by optical link 312. In FIG. 3B, hub 304 is connected to OM 330 by optical link 310 and OM 330 is connected to radio 106. Optical link 311 connects hub 304 to OM 332 which in turn is connected to display support 105. Optical link 308 connects hub 304 to OM 334 which in turn is connected to external port 110.

In one embodiment, hubs 302 and 304 direct data traffic between their respective devices. For example, hub 302 may receive electrical signals from radio controller 152 and 150. These electrical signals may be converted to optical signals by one or more OMs 318. In one embodiment, these optical signals are multiplexed onto optical link 325. In another embodiment, optical link 325 includes optical fibers that are dedicated to particular device communications.

In yet another embodiment, optical link 325 may use a combination of multiplexing and dedicated channels. For example, communications between video controller 150 and display support may use a dedicated optical fiber, while remaining device communications are multiplexed onto optical fiber.

Hub 304 receives optical signals from optical link 325 and directs the optical signals to the appropriate OM. In one embodiment, hub 304 includes a circulator. In a similar manner, OMs 330, 332, and 334 may receive electrical signals from their respective devices, convert the electrical signals to optical signals, and provide the optical signals to hub 304 using the optical links. Hub 304 in turn sends the optical signals to hub 302 using optical link 325.

Figure 3C:
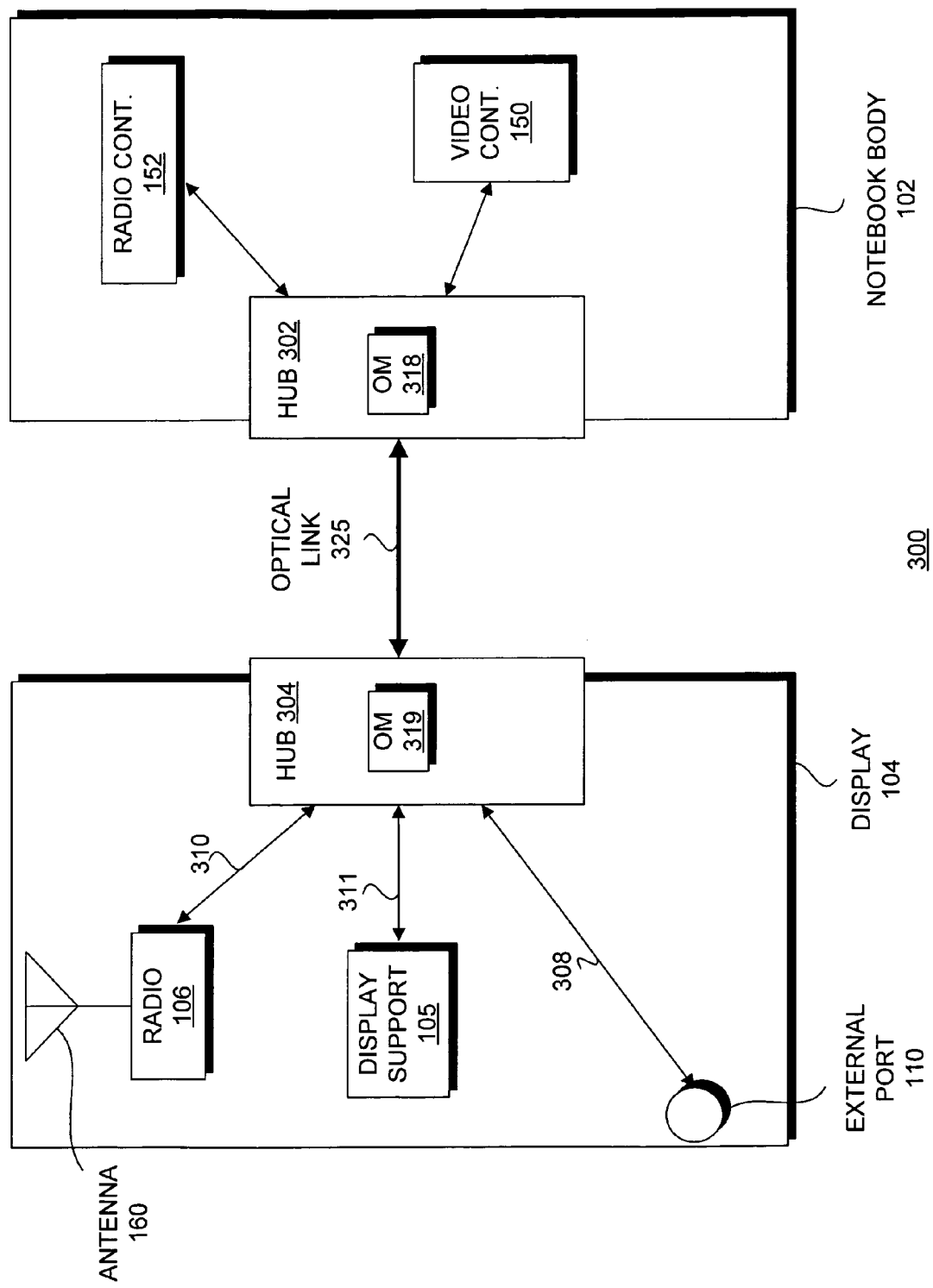
FIG. 3C is a block diagram illustrating one embodiment of a data exchange architecture using optical links in accordance with the teachings of the present invention.

FIG. 3C shows an alternative embodiment of a hub configuration for notebook 300. Hub 304 may include one or more optical modules 319. Hub 304 is coupled to external port 110, radio 106, and display support 105 using electrical connections 308, 310, and 311, respectively. OM(s) 319 of hub 304 couple these electrical connections to optical link 325. In yet another embodiment, connections 307-311 may include a combination of optical links and electrical connections with hub 304.

Embodiments of optical link configurations as described herein provide a scalable architecture with wide-ranging flexibility. One or more devices of a computer system may be connected using a combination of a bus configuration, a point-to-point configuration, a hub configuration, or any combination thereof. For example, in an alternate embodiment of notebook 100, storage 114 may include memory that is coupled to a dedicated OM of OM(s) 118 by a point-to-point configuration, while the remaining devices are coupled as shown in FIG. 1. In this particular embodiment, a central processing unit of notebook 100 may have direct access to memory residing in display 104. Embodiments of devices using optical links as described herein may also be cascaded. The cascading between devices may use optical links, electrical connections, or any combination thereof.

Figure 4:
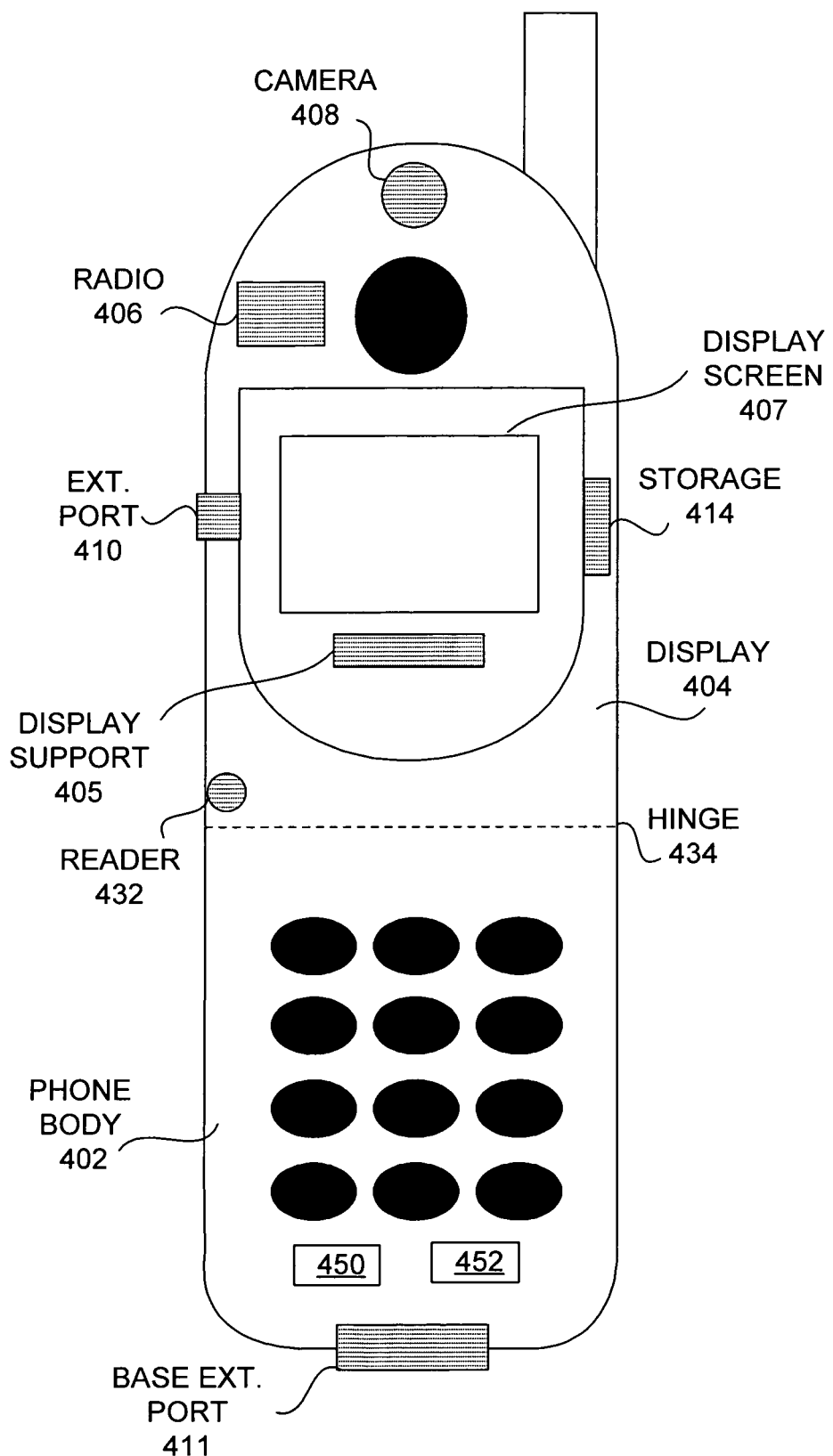
FIG. 4 is a block diagram illustrating one embodiment of a data exchange architecture using optical links in accordance with the teachings of the present invention.

Turn to FIG. 4, an embodiment of a mobile phone 400 is shown. Mobile phone 400 includes a display 404 coupled to phone body 402 by hinge 434. This arrangement may be commonly referred to as a "flip phone." In an alternative embodiment, mobile phone 400 does not include a hinge 434, but is a single piece that does not fold. Other embodiments of mobile phone 400 include a personal digital assistant, a media player, and the like.

Mobile phone 400 may include a reader 432, an external port 410, a display support 405 to support display screen 407, a radio 406, a camera 408, and storage 414. Mobile phone 400 also includes a video controller 450 and a radio controller 452.

Mobile phone 400 may also include a base external port 411. Base external port 411 may be used to couple mobile phone 400 to a keyboard, a battery charger, a cradle for exchanging information with another computer system, and the like.

The devices of display 404 may be coupled to phone body 402 by optical links. The optical links may be in a bus configuration, a point-to-point configuration, a hub configuration, or any combination thereof.

Figure 5A:
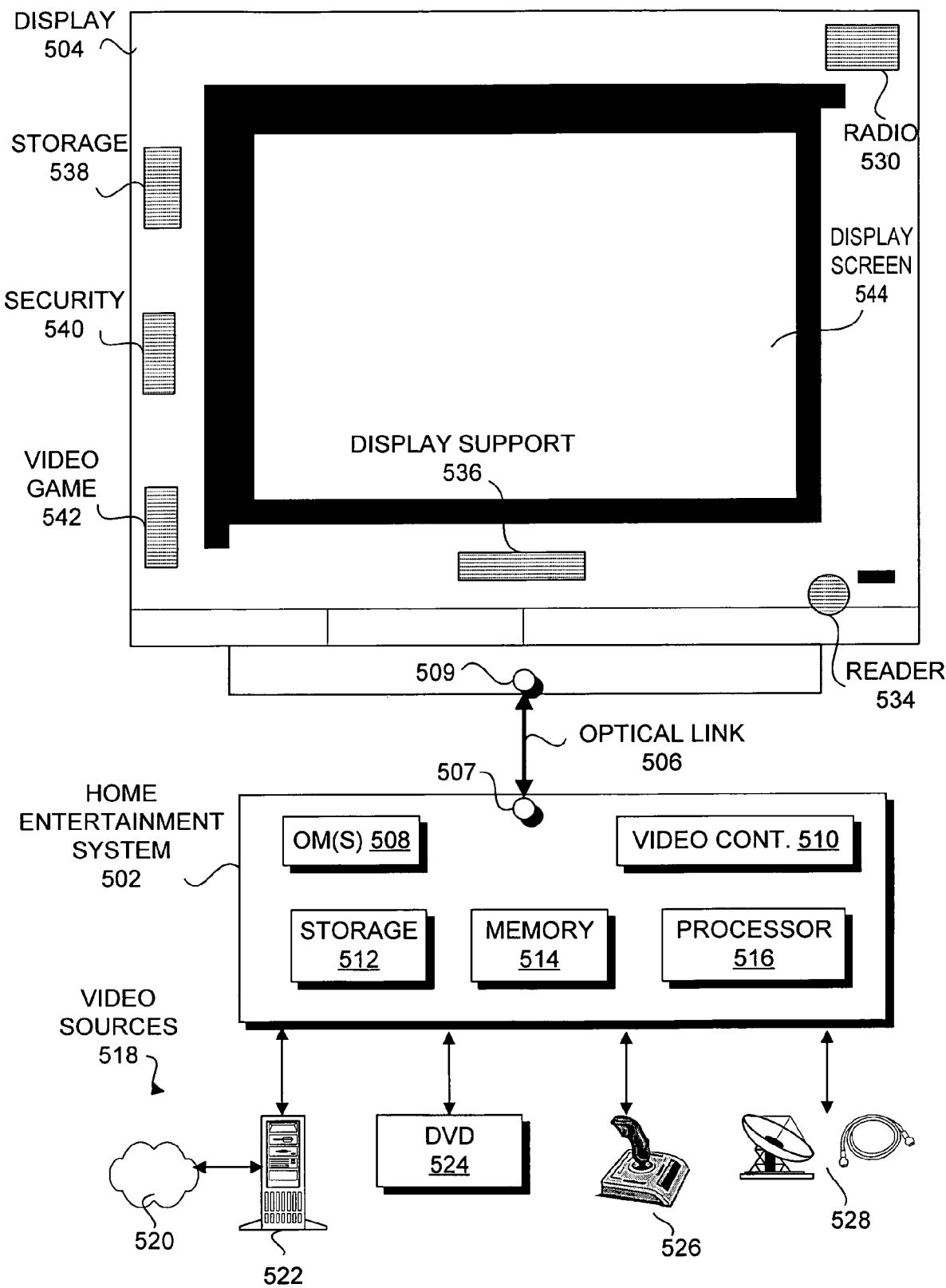
FIG. 5A is a block diagram illustrating one embodiment of a data exchange architecture using optical links in accordance with the teachings of the present invention.

Turning to FIG. 5A, an embodiment of a system 500 is shown. System 500 includes a display 504 coupled to a home entertainment system 502 by optical link 506. In an alternative embodiment, system 502 includes a desktop computer, a server, and the like coupled to display 504 by optical link 506.

Display 504 includes a display screen 544. Embodiments of display screen 544 include a cathode ray tube, a flat panel screen, a High-Definition Television (HDTV) monitor, a Liquid Crystal Display (LCD) screen, a plasma screen, and the like.

Display 504 may include a display support 536, a reader 534, a radio 530, and storage 538. These devices are coupled to home entertainment system 502 using an optical link configuration as described herein.

In one embodiment, display 540 may include a security unit 540. Security unit 540 may include parental controls so parents may prevent viewing of adult content by children. In another embodiment, security unit 540 may include content protection for preventing unauthorized viewing and/or copying of copyrighted material.

In yet another embodiment, security unit 540 may include a Trusted Platform Module (TPM). The TPM is an isolated device of a computer system for establishing trust and trust metrics in a trusted computing environment. The TPM includes cryptographic functions that may be executed on board the TPM hardware. In one embodiment, a TPM includes security measures to disable the TPM should someone attempt to physically modify or physically remove the TPM from a system. The TPM is described in the *TPM Main Specification*, (Parts 1-3), Version 1.2, Oct. 2, 2003. Alternative embodiments of security unit 540 may include other types of trusted hardware devices.

In another embodiment, display 504 may include video game component 542. Video game component 542 may include circuitry to execute instructions loaded from a storage device of home entertainment system 502. In an alternative embodiment, video game component 542 may have stored on board video game instructions.

Home entertainment system 502 may provide video output to display 504 using optical link 506. In one embodiment, home entertainment system 502 includes optical port 507 and display 504 includes optical port 509 for coupling an optical link cable having one or more optical fibers.

Home entertainment system 502 includes one or more optical modules 508 to send and/or receive optical signals using an optical link configuration as described herein. Home entertainment system 502 may include a video controller 510 coupled to OM(s) 508. Home entertainment system 502 may include storage 512, memory 514, and a processor 516.

Home entertainment system 502 may receive video signals from a variety of video sources 518. Video sources 518 may be coupled to home entertainment system 502 using wired connections, wireless connections, or any combination thereof. These video signals may be provided to display 504 using optical link 506. In an alternative embodiment, one or more video sources 518 may couple directly to display 504 using a wired or wireless connection. In another alternative embodiment, one or more video sources 518 may couple directly to display 504 using an optical link.

Video sources 518 include an optical disk, such as DVD (Digital Versatile Discs) player 524, a video game console 526, and a cable television and/or satellite television source 528.

Video sources 518 also includes a computer system 522. In one embodiment, computer system 522 includes a home server. Computer system 522 may be coupled to a network 520, such as the Internet. Thus, a user may "surf" the Internet using display 504. Home entertainment system 502 may receive video signals in the form of streaming video from the Internet, video stored or played by computer system 522, and the like. In another embodiment, home entertainment system 502 is coupled to network 520 without using computer system 522.

It will be appreciated that optical link configurations described herein may be implemented in other machines having a display. For example, a refrigerator may include a display and other devices that are connected using an optical link configuration. Other such machines include copy machines, fax machines, DVD players, and the like.

Figure 5B:
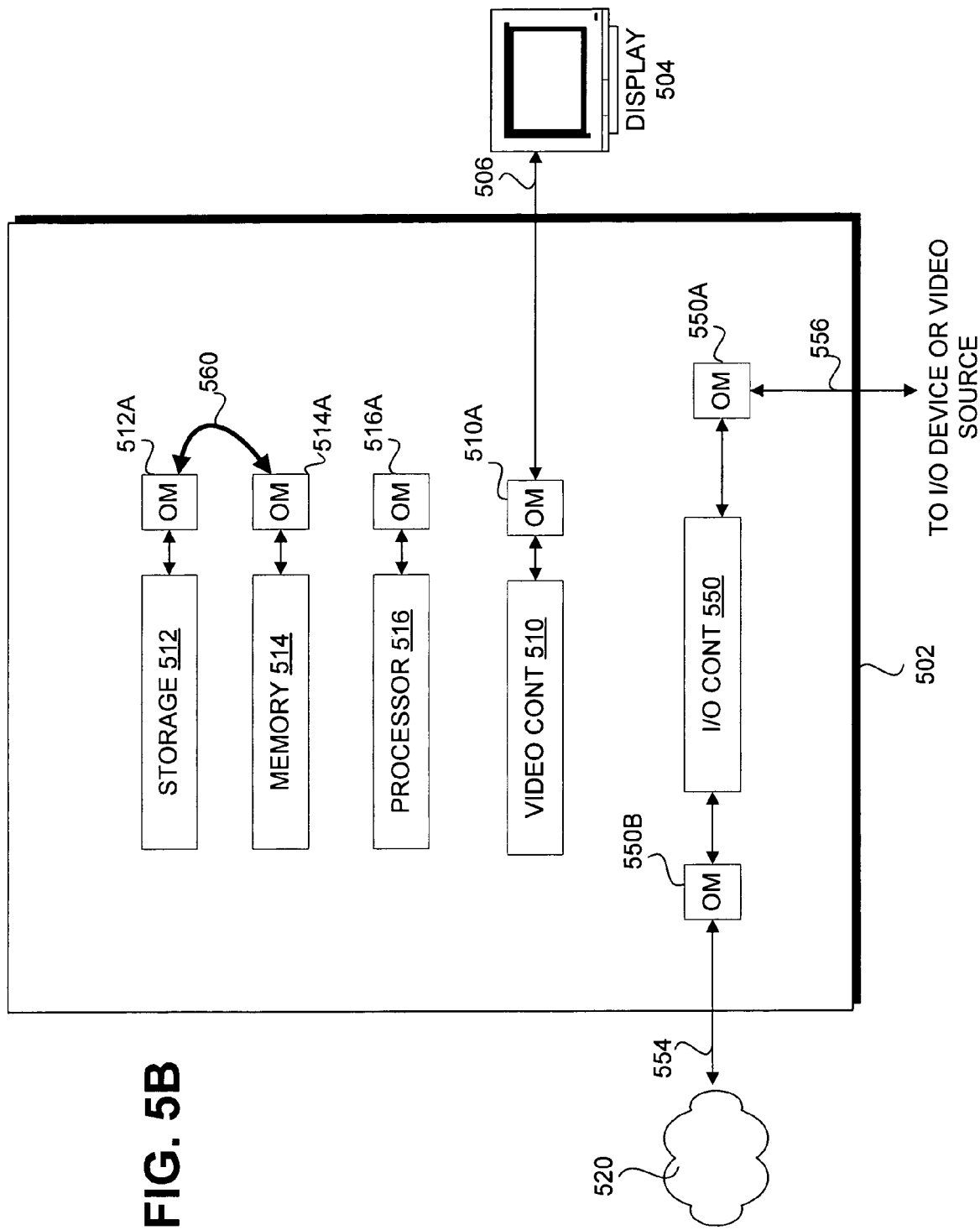
FIG. 5B is a block diagram illustrating one embodiment of a data exchange architecture using optical links in accordance with the teachings of the present invention.

Turning to FIG. 5B, an embodiment of system 502 is shown. Video controller 510 is coupled to OM 510A, storage 512 is coupled to OM 512A, memory 514 is coupled to OM 514A, and processor 516 is coupled to OM 516A. OM 510A is coupled to display 504 using optical link 506. In the embodiment of FIG. 5B, system 502 includes an Input/Output (I/O) controller 550 coupled to OMs 550A and 550B. OM 550A may be coupled to an I/O device or a video source 518 via optical link 556. OM 550B may be coupled to network 520 using optical link 554.

It will be appreciated that video controller 510, storage 512, memory 514, processor 516, and I/O controller 550 may be interconnected using optical link configurations as described herein. For example, in FIG. 5B, storage 512 is coupled to memory 514 using a point-to-point optical link 560. Further, one skilled in the art will appreciate that optical link configurations as described herein for system 502 may be applied to desktop computer systems, servers, and the like.

For example, optical configurations as described herein may be applied to servers in a server rack. In one embodiment, the servers may be connected by a backplane that includes optical links. In one embodiment, such servers include blade servers that may be interconnected by one or more switch cards, where the switch cards route traffic between the blade servers using the backplane. Further, devices internal to the server may be connected using one or more optical link configurations as described herein.

Figure 6A:
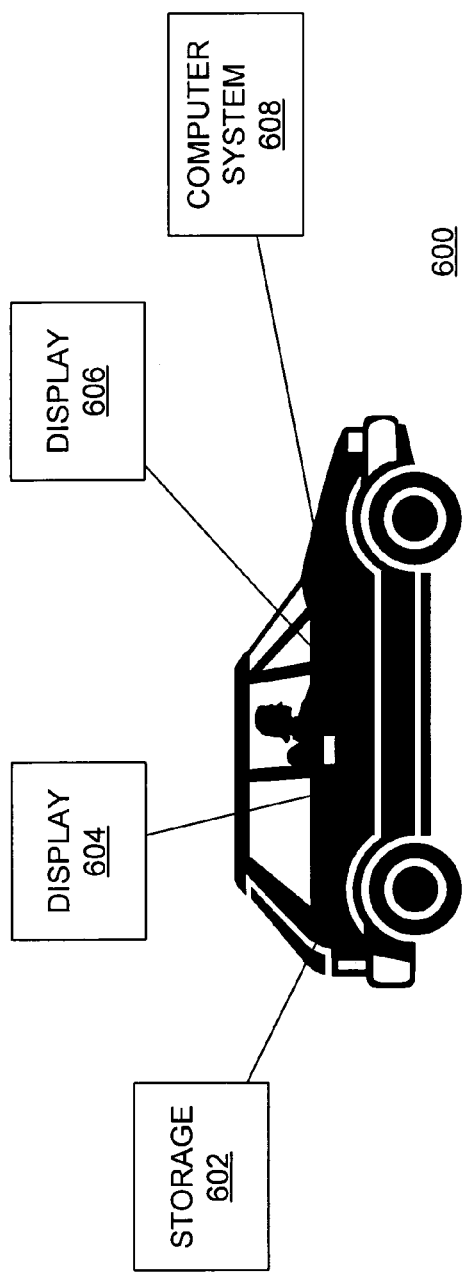
FIG. 6A is a block diagram illustrating one embodiment of a data exchange architecture using optical links in accordance with the teachings of the present invention.

FIG. 6A shows an embodiment of an automobile 600 having an optical link configuration as described herein. Automobile 600 includes a storage 602 coupled to a backseat display 604, a front seat display 606, and a computer system 608 using an optical link configuration as described herein.

Storage 602 may be used to provide video content to displays 604 and 606. In one embodiment, storage 602 includes an optical disk changer in the trunk or under a seat of automobile 600. Such disks may provide movies and other entertainment to back seat display 602, and navigation and other travel related information to front seat display 606. Coordination of displays 604 and 606 with storage 602 may be conducted by computer system 608. In one embodiment, video content is provided to displays 604 and 606 using one or more optical links between storage 602 and displays 604 and 606. In another embodiment, video content from storage 602 passes through computer system 608 before being directed to displays 604 and 606. In yet another embodiment, displays 604 and 606 may include devices that utilize optical links as described herein. For example, the displays may include ports for connecting a video game system.

Figure 6B:
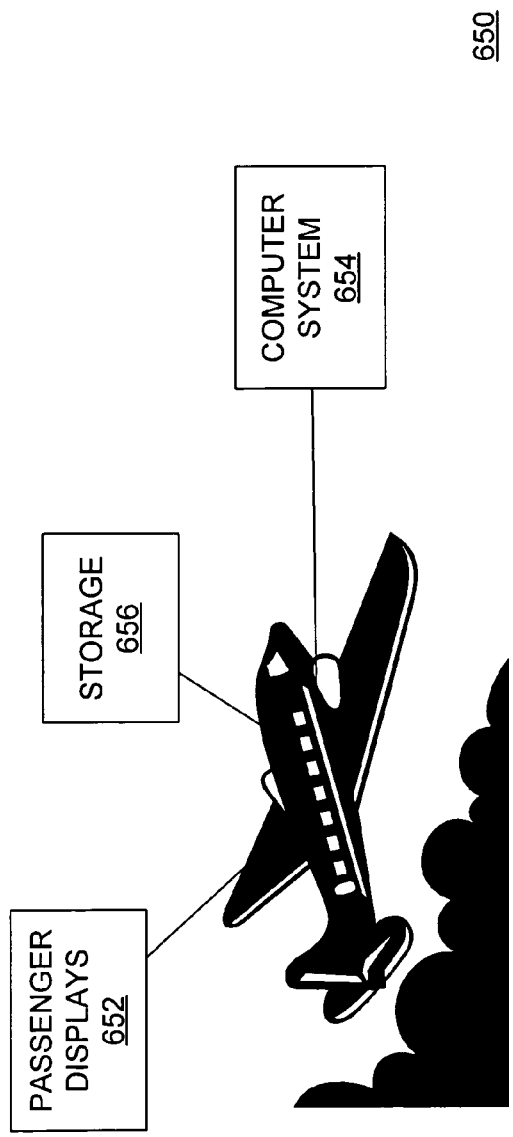
FIG. 6B is a block diagram illustrating one embodiment of a data exchange architecture using optical links in accordance with the teachings of the present invention.

FIG. 6B shows an embodiment of an aircraft 650 having an optical link configuration as described herein. Aircraft 650 includes passenger displays 652, storage 656, and a computer system 654 coupled together using an optical link configuration as described herein. Storage 656 may have stored entertainment for passengers to be played on passenger displays 652. Storage 656 includes optical disks and magnetic disk. In one embodiment, computer system 654 coordinates which passenger displays are to show video content received from storage 656. Display criterion may be based on seating sections, for example first class, or individual passengers who have paid to see a movie. In yet another embodiment, the passenger displays include devices having optical link configurations as described herein. For example, the displays may include ports so that passengers may couple their own mobile computer systems to the displays. In another example, the display may include a camera so that passengers may conduct a video conference using an Internet connection from the aircraft to a ground station.

Figure 7:
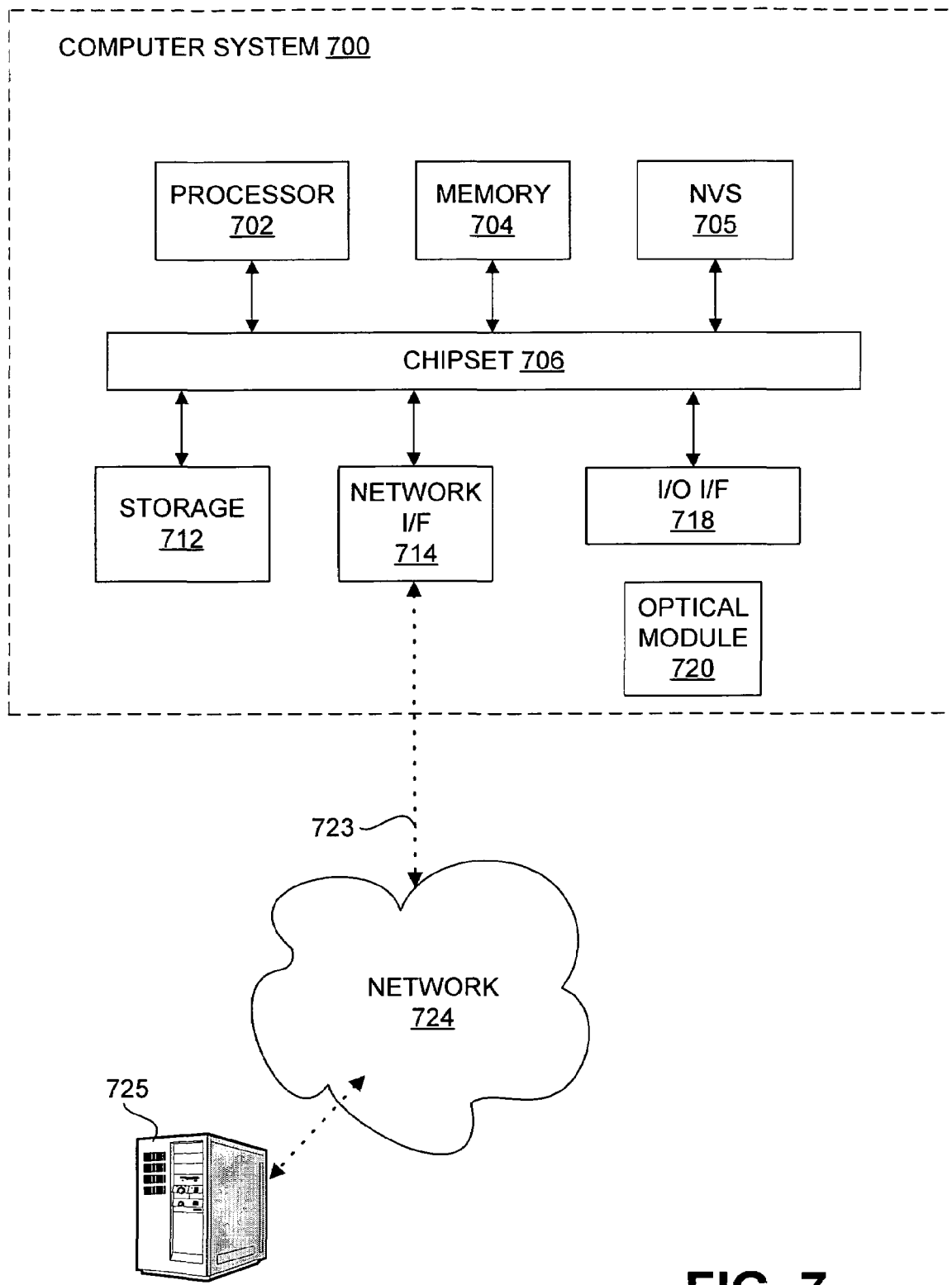
FIG. 7 is a block diagram illustrating one embodiment of a computer system in accordance with the teachings of the present invention.

FIG. 7 is an illustration of one embodiment of an example computer system 700 with which embodiments of the present invention may be implemented. Computer system 700 includes a processor 702 and a memory 704 coupled to a chipset 706. Storage 712, non-volatile storage (NVS) 705, network interface 714, and Input/Output (I/O) Interface (I/F) 718 may also be coupled to chipset 706. Embodiments of computer system 700 include, but are not limited to a desktop computer, a notebook computer, a personal digital assistant, a mobile phone, a media player, and the like. In one embodiment, a computer system includes at least processor 702 coupled to memory 704, processor 702 to execute instructions stored in memory 704.

Computer system 700 may also include one or more optical modules 720. One or more optical module 720 may be used to send and/or receive optical signals using an optical link configuration as described herein. In other embodiments, various devices of computer system 700 may be interconnected using one or more optical link configurations as described herein.

Processor 702 may include, but is not limited to, an Intel Corporation x86, Pentium®, Xeon®, or Itanium® family processor, a graphics processing unit (GPU), and the like. In one embodiment, computer system 700 may include multiple processors. Memory 704 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), and the like.

Chipset 706 may include a Memory Controller Hub (MCH), an Input/Output Controller Hub (ICH), and the like. Chipset 706 may also include system clock support, power management support, audio support, graphics support, and the like. In one embodiment, chipset 706 is coupled to a board that includes sockets for processor 702 and memory 704.

Components of computer system 700 may be connected by various buses including a Peripheral Component Interconnect (PCI) bus, a System Management bus (SMBUS), a Low Pin Count (LPC) bus, a Serial Peripheral Interface (SPI) bus, an Accelerated Graphics Port (AGP) interface, and the like. I/O I/F 718 may be used to coupled computer system 700 to a keyboard, a mouse, a display, a printer, a scanner, and the like.

The computer system 700 may interface to external systems through the network interface 714. Network interface 714 may include, but is not limited to, a modem, a network interface card (NIC), or other interfaces for coupling a computer system to other computer systems. A carrier wave signal 723 is received/transmitted by network interface 714. In the embodiment illustrated in FIG. 7, carrier wave signal 723 is used to interface computer system 700 with a network 724, such as a local area network (LAN), a wide area network (WAN), the Internet, or any combination thereof. In one embodiment, network 724 is further coupled to a remote computer 725 such that computer system 700 and remote computer 725 may communicate over network 724.

The computer system 700 also includes non-volatile storage 705 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), and the like. Storage 712 includes, but is not limited to, a magnetic hard disk, a magnetic tape, an optical disk, and the like. It is appreciated that instructions executable by processor 702 may reside in storage 712, memory 704, non-volatile storage 705, or may be transmitted or received via network interface 714.

It will be appreciated that in one embodiment, computer system 700 may execute operating system (OS) software. For example, one embodiment of the present invention utilizes Microsoft Windows® as the operating system for computer system 700. Other operating systems that may also be used with computer system 700 include, but are not limited to, the Palm operating system, the Apple Macintosh operating system, the Linux operating system, the Unix operating system, and the like.

For the purposes of the specification, a machine-accessible medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-accessible medium includes, but is not limited to, recordable/non-recordable media (e.g., read only memory (ROM), random access memory (RAM), magnetic disk storage media, optical storage media, a flash memory device, etc.). In addition, a machine-accessible medium may include propagated signals such as electrical, optical, acoustical or other forms of propagated signals (e.g., carrier waves, infrared signals, digital signals, etc.).

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description.

The terms used in the following claims should not be construed to limit the invention to the specific embodiments disclosed in the specification. Rather, the following claims are to be construed in accordance with established doctrines of claim interpretation.

What is claimed is:

1. An apparatus, comprising:
a first peripheral device included in a display;
a first optical module coupled to the first peripheral device and included in the display;
a second optical module included in a body proximate to the display and coupled to the first optical module by an optical link; and
a third optical module located in the display and coupled to a second peripheral device, the third optical module coupled to the first optical module in a ring configuration by the optical link, the first and third optical modules to convert optical signals received by the first and third optical modules over the optical link into electrical signals for the first and second peripheral devices, respectively.

2. The apparatus of claim 1 wherein the first and second peripheral devices include at least one of a display support, a radio, a camera, a reader, an external port, a storage unit, a security unit, and a video game support unit.

3. The apparatus of claim 1 wherein the optical link includes an optical bus included in a hinge connecting the display screen to the body, wherein the optical modules are coupled to the optical bus.

4. The apparatus of claim 1 wherein the optical link includes an optical ring, wherein the optical modules are coupled to the optical ring.

5. The apparatus of claim 1, further comprising a hub, the optical modules to receive optical signals via the hub.

6. The apparatus of claim 1 wherein the optical link is coupled directly to the optical modules, the optical link part of a point-to-point optical link configuration.

7. The apparatus of claim 1 wherein the optical link includes plastic optical fiber, wherein data transmitted on the plastic optical fiber has a data rate of at least 4 Gigabits per second.

8. A mobile computer system, comprising:
   a display including a first optical module and a first device, the first optical module coupled to the first device;
   a body including a second optical module, the second optical module coupled to the first optical module by a first optical link; and
   a third optical module located in the display and coupled to the first optical link, the third optical module coupled to a second device, wherein the first optical module and the third optical module are coupled in a ring configuration.

9. The mobile computer system of claim 8 wherein the mobile computer system includes one of a notebook computer, a mobile phone, a personal digital assistant, and a media player.

10. The mobile computer system of claim 8 wherein the first optical module and the third optical module are in a bus configuration.

11. The mobile computer system of claim 10 wherein optical signals for the first optical module and the third optical module are multiplexed on the first optical link.

12. The mobile computer system of claim 8 wherein the third optical module located in the display is coupled to a fourth optical module located in the body by a second optical link, wherein the first optical link and the second optical link are each in a point-to-point configuration.

13. The mobile computer system of claim 8 wherein the first optical module is part of a first hub residing in the display, wherein the second optical module is part of a second hub residing in the body.

14. The mobile computer system of claim 8 wherein a first hub residing in the display directs optical signals between the first optical link and the first optical module, wherein the second optical module is part of a second hub residing in the body.

15. The mobile computer system of claim 8 wherein the first optical link includes plastic optical fiber.

16. The mobile computer system of claim 8 wherein the first and second devices include at least one of a display support, a radio, a camera, a reader, an external port, a storage unit, a security unit, and a video game support unit.

17. The mobile computer system of claim 16 wherein the first device includes a radio and an analog portion of the radio resides in the display and a digital portion of the radio resides in the body.

18. The mobile computer system of claim 8 wherein data transmitted on the first optical link has a data rate of at least 4 Gigabits per second.

19. A system, comprising:
   a computer system, the computer system including:
      a video controller; and
      a first optical module coupled to the video controller;
   a display coupled to the computer system by an optical link, the display including:
      a display support unit;
      a second optical module coupled to the display support unit, wherein the second optical module is coupled to the first optical module via the optical link; and
      a third optical module located in the display and coupled to the optical link, the third optical module coupled to a second device, wherein the second optical module and the third optical module are coupled in a ring configuration.

20. The system of claim 19 wherein the first optical module is coupled to the second optical module using one of a bus configuration, a point-to-point configuration, a hub configuration, a ring configuration, or any combination thereof.

21. The system of claim 19 wherein the computer system includes a home entertainment computer system, wherein the home entertainment computer system to receive video signals from one or more video sources.

22. The system of claim 19 wherein the system resides in an automobile, the automobile including a storage unit coupled to the computer system, the storage unit to store video content to be provided to the display.

23. The system of claim 19 wherein the system resides in an aircraft, the aircraft including a storage unit coupled to the computer system, the storage unit to store video content to be provided to the display.

24. The system of claim 19 wherein two or more devices of the computer system are connected by at least one optical link.

25. The system of claim 19 wherein the optical link includes plastic optical fiber.

26. The system of claim 19 wherein the computer system includes a server, wherein the server is coupled another server by a backplane including at least one optical link.

* * * * *